US009207388B2

(12) United States Patent
Kang et al.

(10) Patent No.: US 9,207,388 B2
(45) Date of Patent: Dec. 8, 2015

(54) LIGHT SOURCE MODULE

(71) Applicants: Chia-Liang Kang, Hsin-Chu (TW);
Yan-Ching Lin, Hsin-Chu (TW);
Ping-Feng Hwang, Hsin-Chu (TW);
Chen-Hung Lin, Hsin-Chu (TW)

(72) Inventors: Chia-Liang Kang, Hsin-Chu (TW);
Yan-Ching Lin, Hsin-Chu (TW);
Ping-Feng Hwang, Hsin-Chu (TW);
Chen-Hung Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 275 days.

(21) Appl. No.: 13/867,140

(22) Filed: Apr. 22, 2013

(65) Prior Publication Data
US 2013/0279199 A1    Oct. 24, 2013

(30) Foreign Application Priority Data

Apr. 23, 2012 (CN) .......................... 2012 1 0121472

(51) Int. Cl.
F21V 8/00        (2006.01)
(52) U.S. Cl.
CPC ............ G02B 6/0068 (2013.01); G02B 6/0021 (2013.01); G02B 6/0016 (2013.01)
(58) Field of Classification Search
CPC ... G02B 6/0068; G02B 6/0021; G02B 6/0016
See application file for complete search history.

(56) References Cited

U.S. PATENT DOCUMENTS

| | | | |
|---|---|---|---|
| 6,913,366 B2 | 7/2005 | Lee | |
| 7,048,427 B2 | 5/2006 | Fujino et al. | |
| 7,357,552 B2 | 4/2008 | Takada | |
| 7,789,549 B2 * | 9/2010 | Tanabe | 362/621 |
| 8,057,087 B2 * | 11/2011 | Chang | 362/621 |
| 8,303,152 B2 * | 11/2012 | Kawashima et al. | 362/612 |
| 2011/0134660 A1 | 6/2011 | Deng et al. | |
| 2011/0261587 A1 | 10/2011 | Kim et al. | |

FOREIGN PATENT DOCUMENTS

| | | |
|---|---|---|
| CN | 1437056 | 8/2003 |
| CN | 1760731 | 4/2006 |
| CN | 102081186 | 6/2011 |

OTHER PUBLICATIONS

"Office Action of Chinese Counterpart Application", issued on Oct. 23, 2014, p. 1-p. 8.

* cited by examiner

Primary Examiner — Elmito Breval
(74) Attorney, Agent, or Firm — Jianq Chyun IP Office

(57) ABSTRACT

A light source module including a light guide plate, a first light-emitting device and a second light-emitting device is provided. The light guide plate has a first surface, a second surface and a light incident surface. The light incident surface includes a first and second light incident sub-surfaces and a first end, wherein the second light incident sub-surface is oblique relative to the first light incident sub-surface. The first light-emitting device is disposed beside the first light incident sub-surface, and the second light-emitting device is disposed beside the second light incident sub-surface. The light guide plate has a visual area, and the visual area has a first corner located beside the first end, a light-emitting range of the second light-emitting device covers the first corner, and the second light incident sub-surface is located between the first end and the first light incident sub-surface.

19 Claims, 5 Drawing Sheets

LIGHT SOURCE MODULE

CROSS-REFERENCE TO RELATED APPLICATION

This application claims the priority benefit of China application serial no. 201210121472.3, filed on Apr. 23, 2012. The entirety of the above-mentioned patent application is hereby incorporated by reference herein and made a part of this specification.

BACKGROUND

1. Technical Field

The invention relates to a light source module.

2. Related Art

Light source modules are grouped into direct type light source modules and side type light source modules, and in the side type light source module, a light guide plate (LGP) is used to guide a light beam emitted from a light emitting device disposed at a side of the LGP to a front side (a light emerging surface) of the LGP, so as to form a surface light source. With development of photoelectric technology, light-emitting diodes (LEDs) gradually replace cold cathode fluorescent lamps (CCFLs) to sever as the light-emitting devices.

As the LED is a directional light source, a dark area is usually formed between two adjacent LEDs, or when none LED is configured at a corner of the LGP, the corner of the LGP is liable to produce the dark area. The known LED has a low power, so that a plurality of LEDs are generally configured beside a side surface (a light incident surface) of the LGP. When more LEDs are used, a space between two adjacent LEDs is relatively small, so that the dark area is relatively small. However, with development of semiconductor technology, the power of the LED can be increased, and the number of the LEDs configured beside the light incident surface can be decreased. When the number of the LEDs is decreased, the space between two adjacent LEDs becomes larger, so that the dark area is larger, and the dark area at the corner of the LGP also becomes larger, which may influence uniformity of the surface light source formed by the backlight module.

According to a disclosure of U.S. Pat. No. 7,048,427, an included angle is formed between two light incident surfaces, and a plurality of light guide device can be arranged in parallel. U.S. Pat. No. 6,913,366 and U.S. Pat. No. 7,357,552 disclose an LGP structure.

SUMMARY

The invention is directed to a light source module, which is adapted to produce a uniform surface light source.

Additional aspects and advantages of the present invention will be set forth in the description of the techniques disclosed in the present invention.

In order to achieve one of the above purposes, all the purposes, or other purposes, one embodiment of the invention provides a light source module including a light guide plate, at least one first light-emitting device and at least one second light-emitting device. The light guide plate has a first surface, a second surface opposite to the first surface and a light incident surface connected to the first surface and the second surface. The light incident surface includes a first light incident sub-surface, a second light incident sub-surface, and a first end, where the second light incident sub-surface is oblique relative to the first light incident sub-surface. The first light-emitting device is disposed beside the first light incident sub-surface, and the second light-emitting device is disposed beside the second light incident sub-surface. The light guide plate has a visual area, and the visual area has a first corner located beside the first end of the light incident surface, a light-emitting range of the second light-emitting device covers the first corner of the visual area, and the second light incident sub-surface is located between the first end and the first light incident sub-surface.

In one embodiment, the light-emitting range of the second light-emitting device is a light-emerging angle range corresponding to a full width at half maximum (FWHM) in a distribution of light intensities provided by the second light-emitting device relative to light-emerging angles of the second light-emitting device.

In one embodiment, the light guide plate has a first recess, and the second light incident sub-surface is a sidewall surface of the first recess.

In one embodiment, the light incident surface further includes a first connection surface connected to the first light incident sub-surface and the second light incident sub-surface, and the first connection surface is another sidewall surface of the first recess.

In one embodiment, the second light incident sub-surface is located between the first end and the first connection surface.

In one embodiment, the second light incident sub-surface is oblique relative to the first light incident sub-surface by $\theta 1$ degrees, and $\theta 1$ is greater than or equal to 10 and is smaller than or equal to 80.

In one embodiment, the first light incident sub-surface has a plurality of first strip-shaped microstructures, each of the first strip-shaped microstructures extends from the first surface to the second surface, and the first strip-shaped microstructures are arranged along a direction substantially parallel to the first surface, and the first light-emitting device emits light towards the first strip-shaped microstructures.

In one embodiment, the second light incident sub-surface has a plurality of second strip-shaped microstructures, each of the second strip-shaped microstructures extends from the first surface to the second surface, and the second strip-shaped microstructures are arranged along a direction substantially parallel to the first surface, and the second light-emitting device emits light towards the second strip-shaped microstructures.

In one embodiment, the number of the second light-emitting devices is plural, and the second light-emitting devices are arranged along a direction substantially parallel to the second light incident sub-surface and the first surface.

In one embodiment, the light incident surface further includes a third light incident sub-surface and a second end, the third light incident sub-surface is oblique relative to the first light incident sub-surface, and is oblique relative to the second light incident sub-surface, and the first light incident sub-surface is located between the second light incident sub-surface and the third light incident sub-surface, the visual area further includes a second corner located beside the second end of the light incident surface, the light source module further includes at least one third light-emitting device disposed beside the third light incident sub-surface, a light-emitting range of the third light-emitting device covers the second corner of the visual area, and the third light incident sub-surface is located between the second end and the first light incident sub-surface.

In one embodiment, the light-emitting range of the third light-emitting device is a light-emerging angle range corresponding to an FWHM in a distribution of light intensities provided by the third light-emitting device relative to light-emerging angles of the third light-emitting device.

In one embodiment, the light guide plate has a second recess, and the third light incident sub-surface is a sidewall surface of the second recess.

In one embodiment, the light incident surface further includes a second connection surface connected to the first light incident sub-surface and the third light incident sub-surface, and the second connection surface is another sidewall surface of the second recess.

In one embodiment, the third light incident sub-surface is located between the second end and the second connection surface.

In one embodiment, the third light incident sub-surface is oblique relative to the first light incident sub-surface by θ2 degrees, and θ2 is greater than or equal to 10 and is smaller than or equal to 80.

In one embodiment, the third light incident sub-surface has a plurality of third strip-shaped microstructures, each of the third strip-shaped microstructures extends from the first surface to the second surface, and the third strip-shaped microstructures are arranged along a direction substantially parallel to the first surface, and the third light-emitting device emits light towards the third strip-shaped microstructures.

In one embodiment, the number of the third light-emitting devices is plural, and the third light-emitting devices are arranged along a direction substantially parallel to the third light incident sub-surface and the first surface.

In one embodiment, the light source module further includes a reflector, disposed adjacent to the second surface.

In one embodiment, the light source module further includes a front frame, wherein the front frame covers a part of the light guide plate outside the visual area, the first light-emitting device and the second light-emitting device.

According to the above descriptions, the light source module according to the embodiment of the invention may have at least one of the following advantages. In the light source module according to the embodiment of the invention, since the light-emitting range of the second light-emitting device covers the first corner of the visual area, and the first light-emitting device irradiates another region of the visual area, the light source module can provide a uniform surface light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
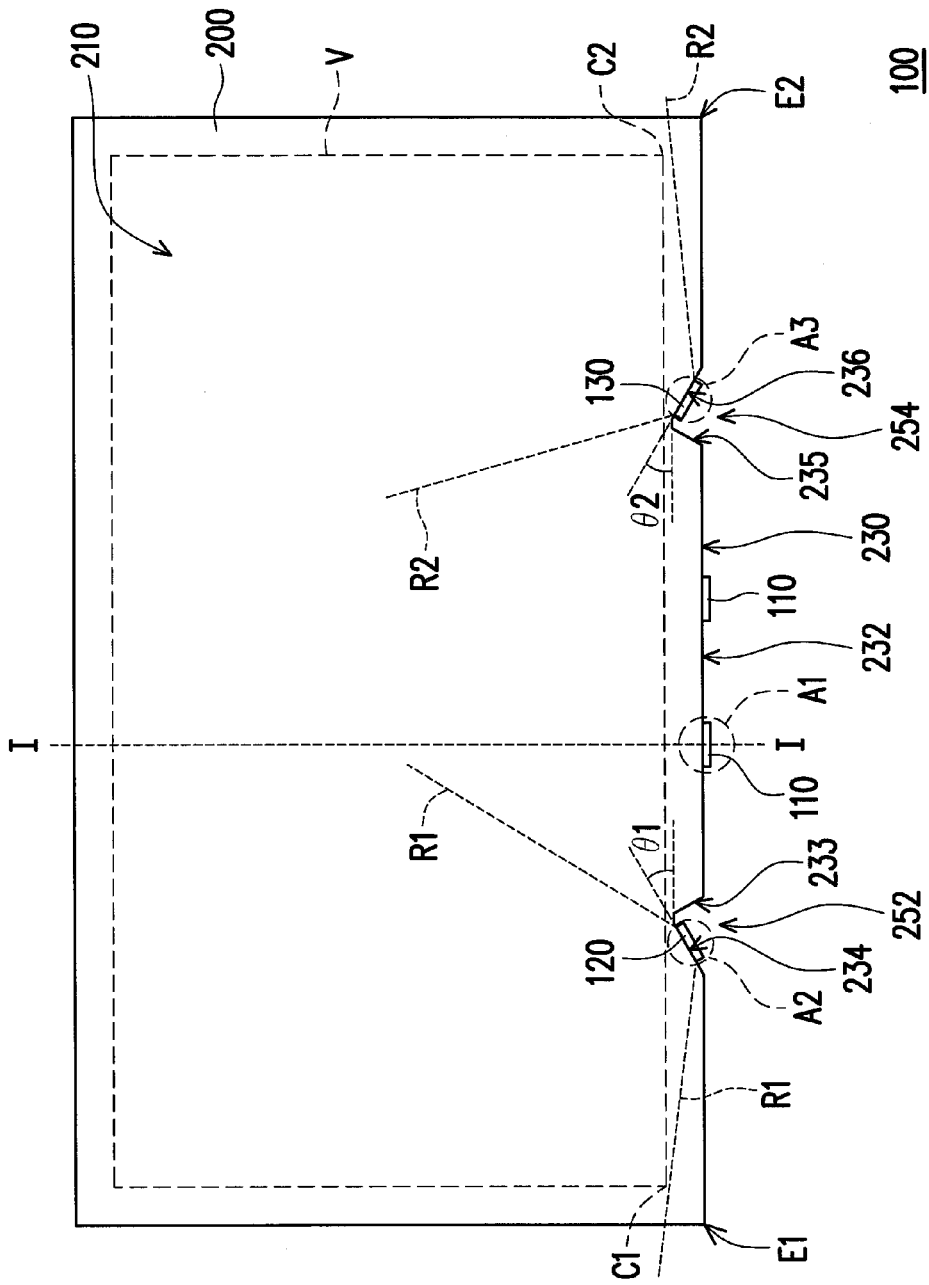
FIG. 1A is a front view of a light source module according to an embodiment of the invention.
Figure 1B:
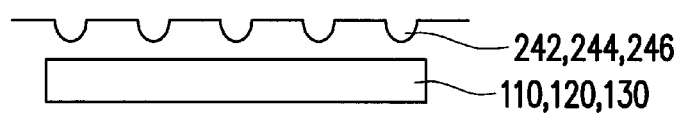
FIG. 1B is an enlarged view of any one of regions A1, A2 and A3 of FIG. 1A.
Figure 1C:
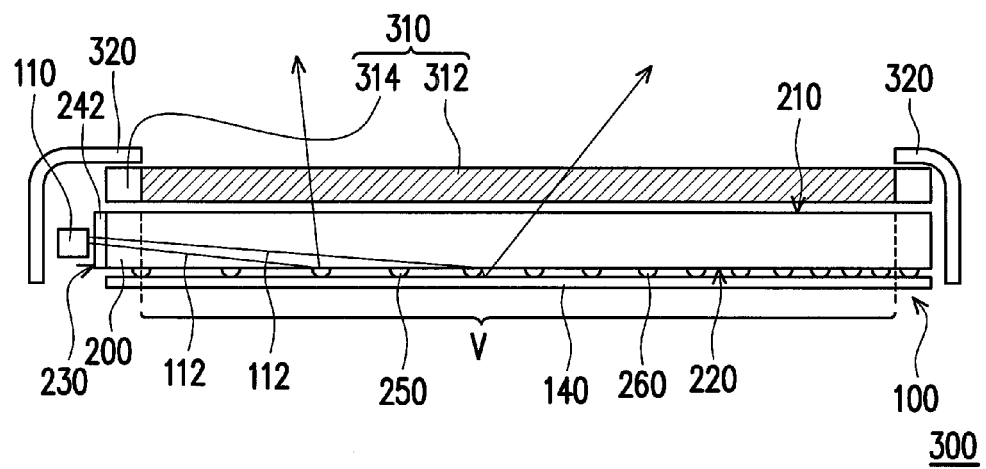
FIG. 1C is a cross-sectional view of the light source module of FIG. 1A applied in a display apparatus.

FIG. 1A is a front view of a light source module according to an embodiment of the invention, FIG. 1B is an enlarged view of any one of regions A1, A2 and A3 of FIG. 1A, and FIG. 1C is a cross-sectional view of the light source module of FIG. 1A applied in a display apparatus, where FIG. 1C illustrates a cross-section of the light source module along an I-I line of FIG. 1A. Referring to FIG. 1A to FIG. 1C, the light source module 100 of the present embodiment includes a light guide plate (LGP) 200, at least one first light-emitting device 110 (two first light-emitting devices 110 are illustrated in FIG. 1A, though the invention is not limited thereto, and in other embodiments, in case that a size of the LGP 200 is relative small or a brightness of the first light-emitting device 110 is great enough, only one first light-emitting device 110 can be configured) and at least one second light-emitting device 120 (only one second light-emitting device 120 is illustrated in FIG. 1A, though the invention is not limited thereto, and the number of the second light-emitting device 120 can be increased according to a design requirement). The LGP 200 has a first surface 210, a second surface 220 opposite to the first surface 210 and a light incident surface 230 connected to the first surface 210 and the second surface 220. The light incident surface 230 includes a first light incident sub-surface 232 and a second light incident sub-surface 234, wherein the second light incident sub-surface 234 is oblique relative to the first light incident sub-surface 232.

The first light-emitting device 110 is disposed beside the first light incident sub-surface 232, and the second light-emitting device 120 is disposed beside the second light incident sub-surface 234. In the present embodiment, the first light-emitting device 110 and the second light-emitting device 120 are, for example, light-emitting diodes (LEDs). However, in other embodiments, the first light-emitting device 110 and the second light-emitting device 120 can also be other suitable light-emitting devices.

The LGP 200 has a visual area V. In an embodiment, the light source module 100 can be used in a display apparatus 300 (shown in FIG. 1C), wherein the visual area V is defined by an active area 312 of the display apparatus 300. In other words, the light source module 100 can be a backlight module of the display apparatus 300. In more detail, the display apparatus 300 includes a display panel 310. The display panel 310 is disposed on top of the first surface 210 of the LGP 200, and the display panel 310 is, for example, a liquid crystal panel. The display panel 310 has the active area 312 and a peripheral area 314 surrounding the active area 312, wherein the active area 312 is, for example, an area containing pixels, and the peripheral area 314 is, for example, an area containing conductive lines and a drive integrated circuit (drive IC). In other words, the active area 312 containing pixels corresponds to the visual area V, and sizes thereof are substantially the same. In the present embodiment, the display apparatus 300 further includes a front frame 320. The front frame 320 covers the peripheral are 314 and exposes the active area 312, i.e. the front frame 320 exposes the visual area V. In an embodiment, the visual area V can also be defined as an area exposed by the front frame 320.

A light-emitting range R1 of the second light-emitting device 120 covers a first corner C1 of the visual area V located beside a first end E1 of the light incident surface 230, and the second light incident sub-surface 234 is located between the first end E1 and the first light incident sub-surface 232.

In an embodiment, the light incident surface 230 further includes a third light incident sub-surface 236. The third light incident sub-surface 236 is oblique relative to the first light incident sub-surface 232, and is oblique relative to the second light incident sub-surface 234. The first light incident sub-surface 232 is located between the second light incident sub-surface 234 and the third light incident sub-surface 236. The light source module 100 further includes at least one third light-emitting device 130. The third light-emitting device 130 is disposed beside the third light incident sub-surface 236 (one third light-emitting device 130 is illustrated in FIG. 1A, though the invention is not limited thereto, and in other embodiments, in case that the size of the LGP 200 is relatively small, the third light-emitting device 130 and the third light incident sub-surface 236 can be omitted). The third light-emitting device 130 is, for example, an LED. However, in other embodiments, the third light-emitting device 130 can also be any other suitable light-emitting device. A light-emitting range R2 of the third light-emitting device 130 covers a second corner C2 of the visual area V located beside a second end E2 of the light incident surface 230, and the third light incident sub-surface 236 is located between the second end E2 and the first light incident sub-surface 232.

In the present embodiment, the light-emitting range R1 of the second light-emitting device 120 is a light-emerging angle range corresponding to a full width at half maximum (FWHM) in a distribution of light intensities provided by the second light-emitting device 120 relative to light-emerging angles of the second light-emitting device 120, and the light-emitting range R2 of the third light-emitting device 130 is a light-emerging angle range corresponding to the FWHM in a distribution of light intensities provided by the third light-emitting device 130 relative to light-emerging angles of the third light-emitting device 130. In more detail, the light intensities provided by the light-emitting device (for example, the second light-emitting device 120 or the third light-emitting device 130) may have different values at different light-emerging angles, and has a maximum value at one light-emerging angle at least, and the so-called light-emerging angle range corresponding to the FWHM refers to a light emerging angle range formed by the light-emerging angles corresponding to the light intensities greater than or equal to a half of the maximum light intensity.

In an embodiment, the LGP 200 has a first recess 252, and the second light incident sub-surface 234 is a sidewall surface of the first recess 252. Moreover, the light incident surface 230 further includes a first connection surface 233, which is connected to the first light incident sub-surface 232 and the second light incident sub-surface 234, and the first connection surface 233 is another sidewall surface of the first recess 252. In another embodiment, the LGP 200 has a second recess 254, and the third light incident sub-surface 236 is a sidewall surface of the second recess 254. Moreover, the light incident surface 230 further includes a second connection surface 235, which is connected to the first light incident sub-surface 232 and the third light incident sub-surface 236, and the second connection surface 235 is another sidewall surface of the second recess 254.

In an embodiment, after the light emitted from the first light-emitting device 110, the second light-emitting device 120 and the third light-emitting device 130 (for example, a light 112 emitted from the first light-emitting device 110 of FIG. 1C) enters the LGP 200 respectively through the first light incident sub-surface 232, the second light incident sub-surface 234 and the third light incident sub-surface 236, the light is constantly and totally reflected by the first surface 210 and the second surface 220 and is confined within the LGP 200. However, optical microstructures 250 and 260 configured to the surface of the LGP 200 (for example, at least one of the first surface 210 and the second surface 220, and in FIG. 1C, the optical microstructures 250 and 260 are configured to the second surface 220, though the invention is not limited thereto) can spoil the total reflections, and scatter the light emitted from the first light-emitting device 110, the second light-emitting device 120 and the third light-emitting device 130. A part of the light scattered by the optical microstructures 250 and 260 departs the LGP 200 through the first surface 210. Moreover, a reflector 140 can be configured adjacent to the second surface 220, and the other part of the light scattered by the optical microstructures 250 and 260 is transmitted to the reflector 140 and is reflected back to the LGP 200 by the reflector 140, and such light again enters the LGP 200 through the second surface 220, and is transmitted to external of the LGP 200 through the first surface 210 (i.e. the first surface 210 is a light-emerging surface of the LGP 200). In this way, a surface light source can be formed on the first surface 210 of the LGP 200. By adjusting a distribution density of the optical microstructures 250 and 260 on the surface of the LGP 200, the surface light source can be uniformed. In the present embodiment, the optical microstructures 250 and 260 are, for example, bumps, dents, convex patterns, concave patterns or a structure using a scattering material.

In the light source module 100 of the present embodiment, since the light-emitting range R1 of the second light-emitting device 120 covers the first corner C1 of the visual area V, the light-emitting range R2 of the third light-emitting device 130 covers the second corner C2 of the visual area V, and the first light-emitting device 110 irradiates another region (for example, a region in front of the first light-emitting device 110) of the visual area V, the light source module 110 can provide uniform surface light source. Moreover, since the second light incident sub-surface 234 and the third light incident sub-surface 236 are oblique relative to the first light incident sub-surface 232, even if the number of the light-emitting devices in the light source module 100 is relatively less compared to light-emitting devices of a conventional light source module, a dark area problem on the LGP 200 is still not serious. In other words, in the light source module 100, relatively less light-emitting devices can be used to form the uniform surface light source, and the problem of the related art that the surface light source is uneven due to reduction of the number of the light-emitting devices can be mitigated. Since the light source module 100 may use less light-emitting devices, the cost thereof is relatively low. Moreover, since the number of the used light-emitting devices is less, a space between two adjacent light-emitting devices is larger, so that the light source module 100 has better heat dissipating efficiency.

In other embodiments, when a width of the required surface light source is relatively narrow, the light source module may apply the first light-emitting device 110, the second light-emitting device 120, the first light incident sub-surface 232 and the second light incident sub-surface 234 without applying the third light-emitting device 130 and the third light incident sub-surface 236. Alternatively, the light source module may apply the first light-emitting device 110, the third light-emitting device 130, the first light incident sub-surface 232 and the third light incident sub-surface 236 without applying the second light-emitting device 120 and the second light incident sub-surface 234. Alternatively, a width of the first light incident surface 232 along a direction parallel to the first surface 210 can be shortened, and the number of the first light-emitting device in front of the first light incident sub-surface 232 can be reduced (for example, reduced to one).

In the present embodiment, the second light incident sub-surface 234 is oblique relative to the first light incident sub-surface 232 by $\theta 1$ degrees, and $10 \le \theta 1 \le 80$. Moreover, in the present embodiment, the third light incident surface 236 is oblique relative to the first light incident sub-surface 232 by $\theta 2$ degrees, and $10 \le \theta 2 \le 80$. When the angles $\theta 1$ and $\theta 2$ fall within the above range, uniformity of the surface light source provided by the light source module 100 can be further enhanced. Moreover, when the angles $\theta 1$ and $\theta 2$ are equal to about 20, the light-emerging angle range of the light emitted from the first light-emitting device 110, the second light-emitting device 120 and the third light-emitting device 130 covers the whole visual area V in a uniform and good manner. Moreover, in the present embodiment, an optical axis of the first light-emitting device 110 is substantially perpendicular to the first light incident sub-surface 232, an optical axis of the second light-emitting device 120 is substantially perpendicular to the second light incident sub-surface 234, and an optical axis of the third light-emitting device 130 is substantially perpendicular to the third light incident sub-surface 236, though the invention is not limited thereto.

Figure 2A:
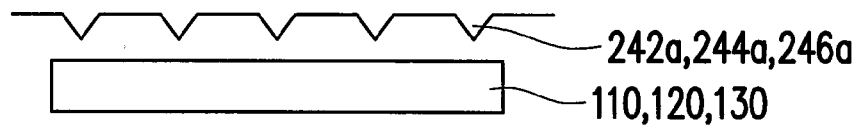
FIG. 2A-FIG. 2D illustrate variations of a strip-shaped microstructure of FIG. 1B.
Figure 2B:
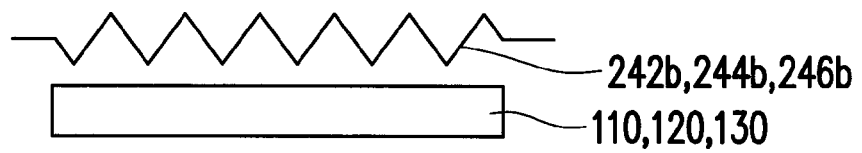
Figure 2C:
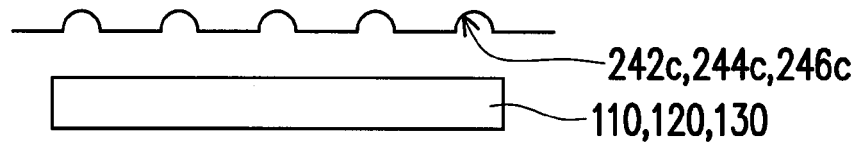
Figure 2D:
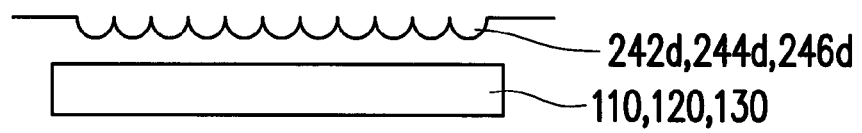

In the present embodiment, the first light incident sub-surface 232 has a plurality of first strip-shaped microstructures 242, each of the first strip-shaped microstructures 242 extends from the first surface 210 to the second surface 220, and the first strip-shaped microstructures 242 are arranged along a direction substantially parallel to the first surface 210, and the first light-emitting device 110 emits light towards the first strip-shaped microstructures 242. Moreover, in the present embodiment, the second light incident sub-surface 234 has a plurality of second strip-shaped microstructures 244, each of the second strip-shaped microstructures 244 extends from the first surface 210 to the second surface 220, and the second strip-shaped microstructures 244 are arranged along a direction substantially parallel to the first surface 210, and the second light-emitting device 120 emits light towards the second strip-shaped microstructures 244. Moreover, in the present embodiment, the third light incident sub-surface 236 has a plurality of third strip-shaped microstructures 246, each of the third strip-shaped microstructures 246 extends from the first surface 210 to the second surface 220, and the third strip-shaped microstructures 246 are arranged along a direction substantially parallel to the first surface 210, and the third light-emitting device 130 emits light towards the third strip-shaped microstructures 246. The first strip-shaped microstructures 242, the second strip-shaped microstructures 244 and the third strip-shaped microstructures 246 can respectively scatter the light emitted by the first light-emitting device 110, the second light-emitting device 120 and the third light-emitting device 130, so as to further enhance the uniformity of the surface light source of the light source module 100. In FIG. 1B, the first strip-shaped microstructures 242, the second strip-shaped microstructures 244 and the third strip-shaped microstructures 246 are, for example, a plurality of arc rod-like protrusions spaced from each other, though the invention is not limited thereto. In other embodiments, as shown in FIG. 2A, the first strip-shaped microstructures 242a, the second strip-shaped microstructures 244a and the third strip-shaped microstructures 246a can also be a plurality of triangle rod-like protrusions spaced from each other. Alternatively, as shown in FIG. 2B, the first strip-shaped microstructures 242b, the second strip-shaped microstructures 244b and the third strip-shaped microstructures 246b can also be a plurality of triangle rod-like protrusion-recess pairs connected to each other. Alternatively, as shown in FIG. 2C, the first strip-shaped microstructures 242c, the second strip-shaped microstructures 244c and the third strip-shaped microstructures 246c can also be a plurality of arc rod-like recesses spaced from each other. Alternatively, as shown in FIG. 2D, the first strip-shaped microstructures 242d, the second strip-shaped microstructures 244d and the third strip-shaped microstructures 246d can also be a plurality of arc rod-like protrusions connected to each other. The strip-shaped microstructures shown in FIG. 1B and FIG. 2A-FIG. 2D are only examples, and in other embodiments, the first, the second and the third strip-shaped microstructures can also be strip-shaped microstructures of any other types. Moreover, the strip-shaped microstructures of different types can be combined for utilization.

Figure 3:
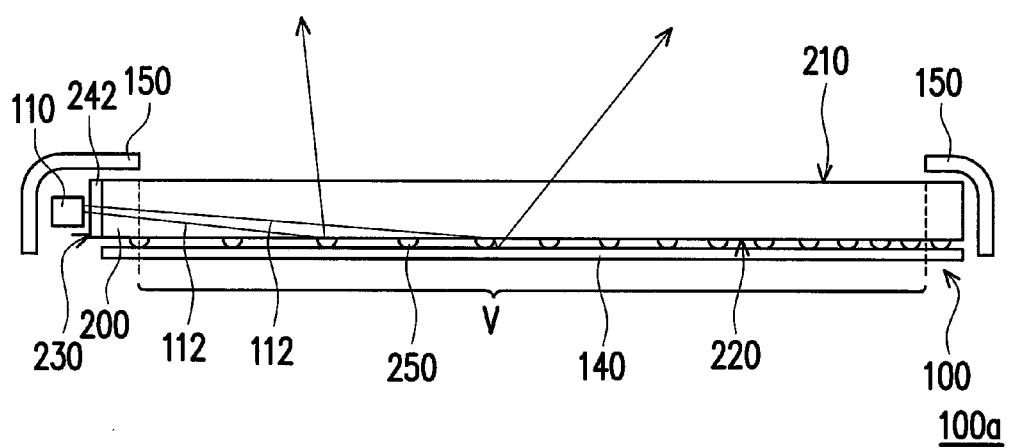
FIG. 3 is a cross-sectional view of a light source module according to another embodiment of the invention.

FIG. 3 is a cross-sectional view of a light source module according to another embodiment of the invention. Referring to FIG. 3, the light source module 100a of the present embodiment is similar to the light source module 100 of FIG. 1C, and differences therebetween are described as follows. The light source module 100a of the present embodiment further includes a front frame 150, which covers a part of the LGP 200 outside the visual area V, the first light-emitting device 110 and the second light-emitting device 120 (the second light-emitting device 120 is not illustrated in FIG. 3 for simplicity's sake, and referring to FIG. 1A for the second light-emitting device 120). In the present embodiment, the front frame 150 can also cover the third light-emitting device 130 (shown in FIG. 1A). In other words, in the present embodiment, the visual area V of the light source module 100a can be confined by the front frame 150 of the light source module 100a. For example, the light source module 100a can be used in lighting fixtures for providing uniform and non-glare surface light source for indoor or outdoor users.

Figure 4:
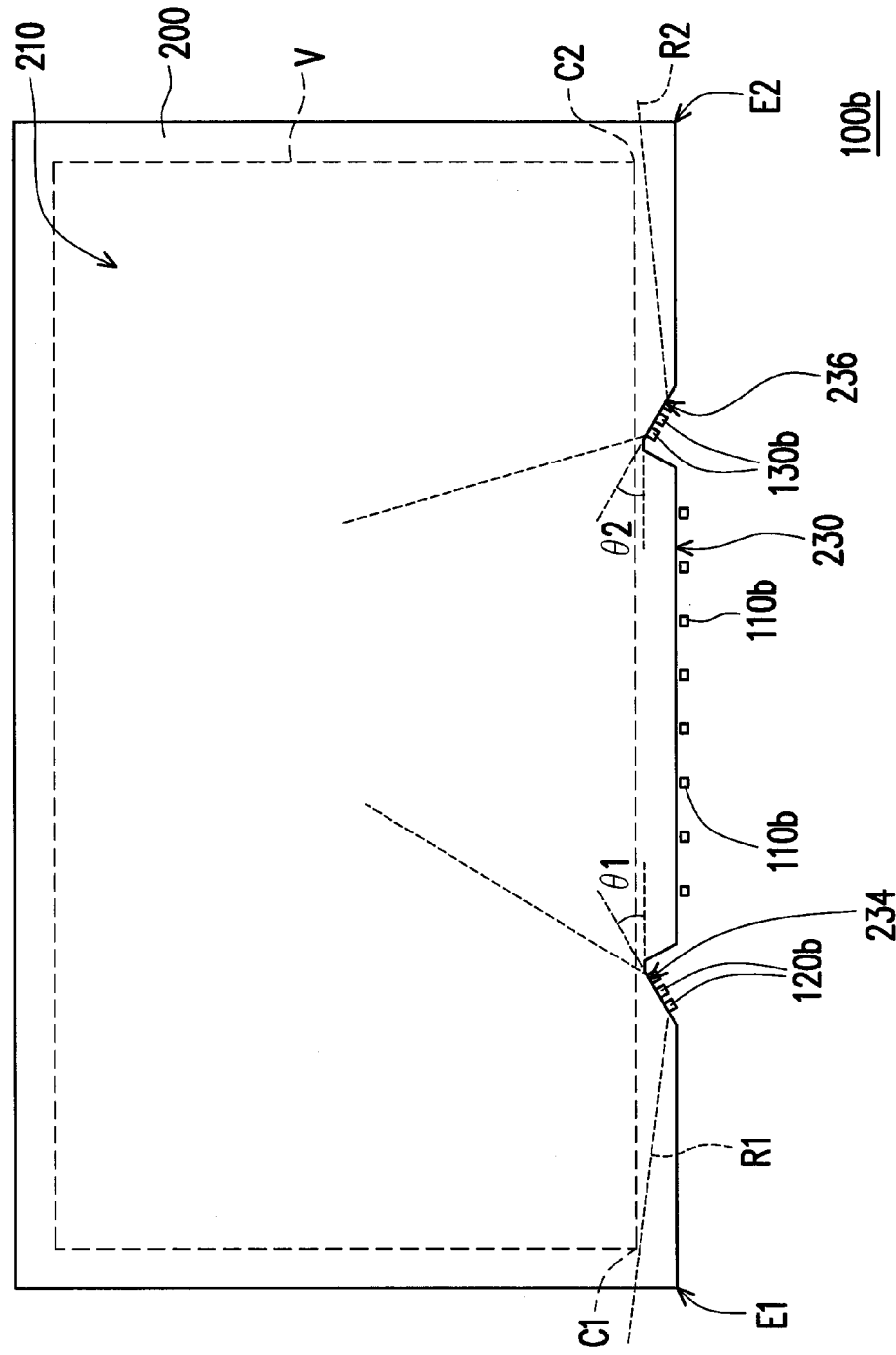
FIG. 4 is a front view of a light source module according to still another embodiment of the invention.

FIG. 4 is a front view of a light source module according to still another embodiment of the invention. Referring to FIG. 4, the light source module 100b of the present embodiment is similar to the light source module 100 of FIG. 1A, and differences therebetween are described as follows. In the light source module 100b of the present embodiment, the number of the second light-emitting devices 120b is plural, and the second light-emitting devices 120b are arranged along a direction substantially parallel to the second light incident sub-surface 234 and the first surface 210. Moreover, the number of the third light-emitting devices 130b is plural, and the third light-emitting devices 130b are arranged along a direction substantially parallel to the third light incident sub-surface 236 and the first surface 210. Moreover, in the present embodiment, the number of the first light-emitting devices 110b configured in front of the first light incident sub-surface 232 can also be adjusted according to a width of the first light incident sub-surface 232, and in FIG. 4, a plurality of the first light-emitting devices 110b are illustrated.

In summary, the light source module according to the embodiments of the invention may have at least one of the following advantages. In the light source module according to the embodiments of the invention, since the light-emitting range of the second light-emitting device covers the first corner of the visual area, and the first light-emitting device irradiates the other region of the visual area, the light source module can provide a uniform surface light source. In the light source module of another embodiment of the invention, the light-emitting range of the third light-emitting device covers the second corner of the visual area, by which the uniform surface light source is further provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, the terms such as "the first", "the second" and "the third", etc. referred in the specification and claims are merely used to name the elements or distinguish different embodiments or ranges, and should not be regarded as limiting the upper or lower bound of the number of the components/devices.

What is claimed is:

1. A light source module, comprising:
   a light guide plate, having a first surface, a second surface opposite to the first surface, and a light incident surface connected to the first surface and the second surface, wherein the light incident surface comprises a first light incident sub-surface, a second light incident sub-surface and a first end, and the second light incident sub-surface is oblique relative to the first light incident sub-surface;
   at least one first light-emitting device, disposed beside the first light incident sub-surface; and
   at least one second light-emitting device, disposed beside the second light incident sub-surface, wherein the light guide plate has a visual area, and the visual area has a first corner located beside the first end of the light incident surface, a light-emitting range of the second light-emitting device covers the first corner of the visual area, and the second light incident sub-surface is located between the first end and the first light incident sub-surface.

2. The light source module as claimed in claim 1, wherein the light-emitting range of the second light-emitting device is a light-emerging angle range corresponding to a full width at half maximum (FWHM) in a distribution of light intensities provided by the second light-emitting device relative to light-emerging angles of the second light-emitting device.

3. The light source module as claimed in claim 1, wherein the light guide plate has a first recess, and the second light incident sub-surface is a sidewall surface of the first recess.

4. The light source module as claimed in claim 3, wherein the light incident surface further comprises a first connection surface connected to the first light incident sub-surface and the second light incident sub-surface, and the first connection surface is another sidewall surface of the first recess.

5. The light source module as claimed in claim 4, wherein the second light incident sub-surface is located between the first end and the first connection surface.

6. The light source module as claimed in claim 5, wherein the second light incident sub-surface is oblique relative to the first light incident sub-surface by θ1 degrees, and θ1 is greater than or equal to 10 and is smaller than or equal to 80.

7. The light source module as claimed in claim 1, wherein the first light incident sub-surface has a plurality of first strip-shaped microstructures, each of the first strip-shaped microstructures extends from the first surface to the second surface, and the first strip-shaped microstructures are arranged along a direction substantially parallel to the first surface, and the first light-emitting device emits light towards the first strip-shaped microstructures.

8. The light source module as claimed in claim 1, wherein the second light incident sub-surface has a plurality of second strip-shaped microstructures, each of the second strip-shaped microstructures extends from the first surface to the second surface, and the second strip-shaped microstructures are arranged along a direction substantially parallel to the first surface, and the second light-emitting device emits light towards the second strip-shaped microstructures.

9. The light source module as claimed in claim 1, wherein the number of the second light-emitting devices is plural, and the second light-emitting devices are arranged along a direction substantially parallel to the second light incident sub-surface and the first surface.

10. The light source module as claimed in claim 1, wherein the light incident surface further comprises a third light incident sub-surface and a second end, the third light incident sub-surface is oblique relative to the first light incident sub-surface, and is oblique relative to the second light incident sub-surface, and the first light incident sub-surface is located between the second light incident sub-surface and the third light incident sub-surface, the visual area further comprises a second corner located beside the second end of the light incident surface, the light source module further comprises at least one third light-emitting device disposed beside the third light incident sub-surface, a light-emitting range of the third light-emitting device covers the second corner of the visual area, and the third light incident sub-surface is located between the second end and the first light incident sub-surface.

11. The light source module as claimed in claim 10, wherein the light-emitting range of the third light-emitting device is a light-emerging angle range corresponding to an FWHM in a distribution of light intensities provided by the third light-emitting device relative to light-emerging angles of the third light-emitting device.

12. The light source module as claimed in claim 10, wherein the light guide plate has a second recess, and the third light incident sub-surface is a sidewall surface of the second recess.

13. The light source module as claimed in claim 12, wherein the light incident surface further comprises a second connection surface connected to the first light incident sub-surface and the third light incident sub-surface, and the second connection surface is another sidewall surface of the second recess.

14. The light source module as claimed in claim 13, wherein the third light incident sub-surface is located between the second end and the second connection surface.

15. The light source module as claimed in claim 14, wherein the third light incident sub-surface is oblique relative to the first light incident sub-surface by θ2 degrees, and θ2 is greater than or equal to 10 and is smaller than or equal to 80.

16. The light source module as claimed in claim 10, wherein the third light incident sub-surface has a plurality of third strip-shaped microstructures, each of the third strip-shaped microstructures extends from the first surface to the second surface, and the third strip-shaped microstructures are arranged along a direction substantially parallel to the first surface, and the third light-emitting device emits light towards the third strip-shaped microstructures.

17. The light source module as claimed in claim 10, wherein the number of the third light-emitting devices is plural, and the third light-emitting devices are arranged along a direction substantially parallel to the third light incident sub-surface and the first surface.

18. The light source module as claimed in claim 1, further comprising a reflector, disposed adjacent to the second surface.

19. The light source module as claimed in claim 1, further comprising a front frame, wherein the front frame covers a part of the light guide plate outside the visual area, the first light-emitting device and the second light-emitting device.

* * * * *